Oct. 31, 1967   F. L. CALHOUN ETAL   3,349,906
OPTICAL INSPECTION SYSTEM
Filed Aug. 4, 1964                          4 Sheets-Sheet 1
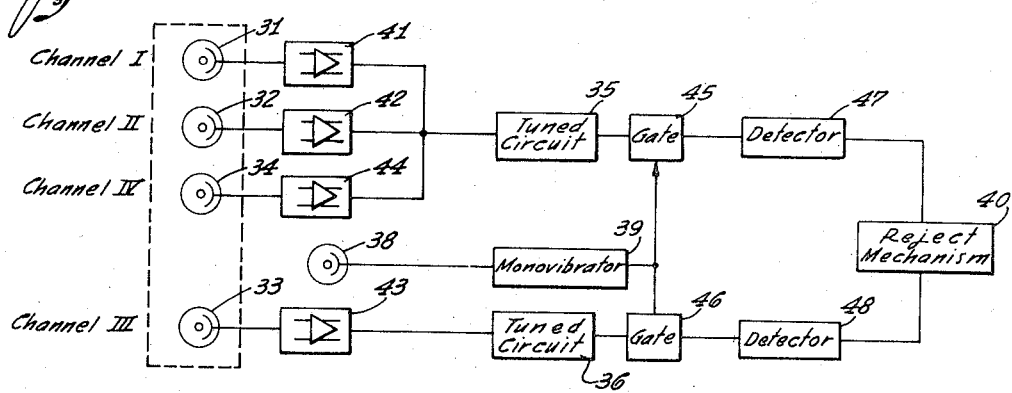
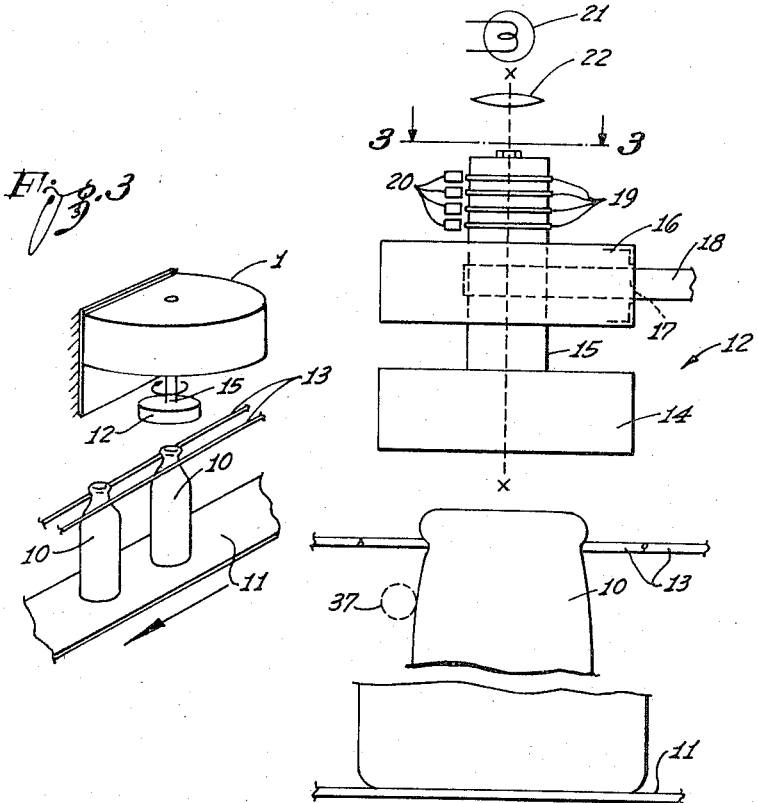
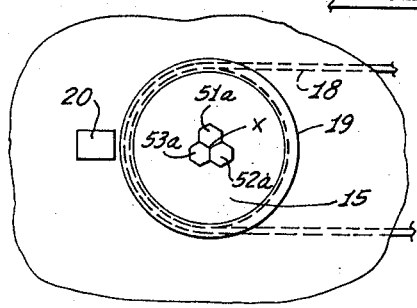
INVENTORS:
Fredrick L. Calhoun
Ronald A. Dawson
Attorneys

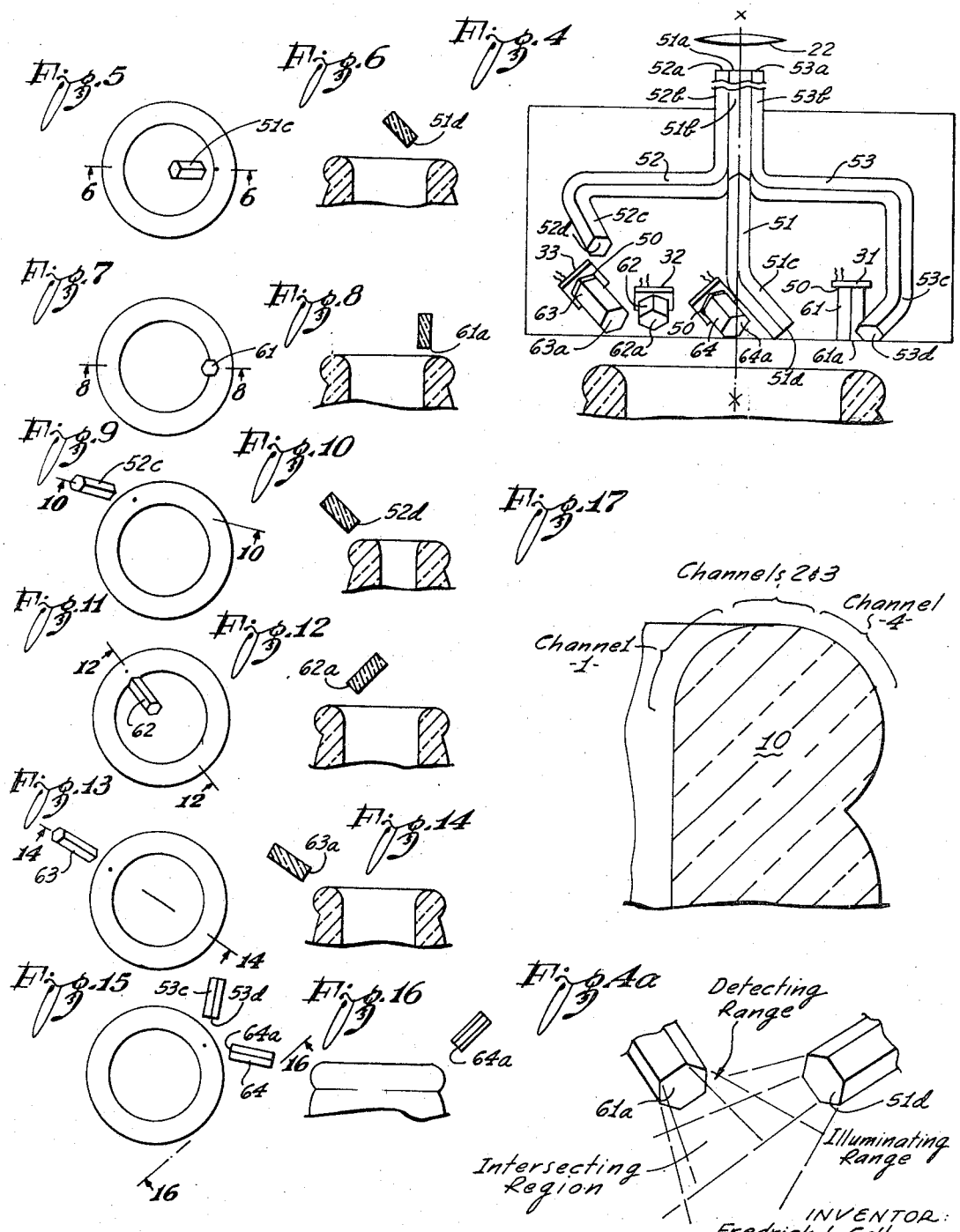

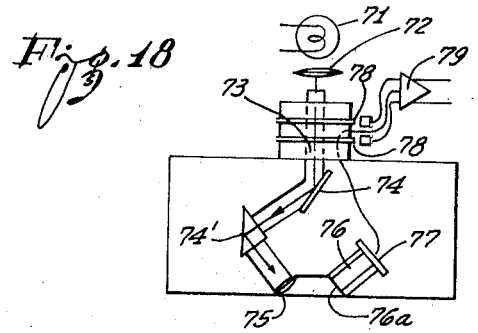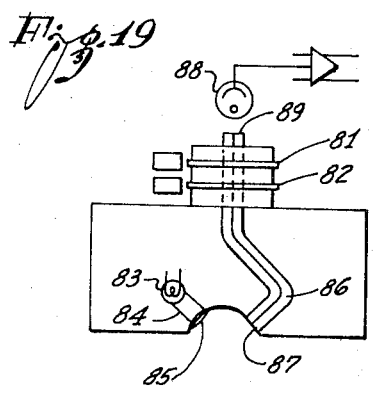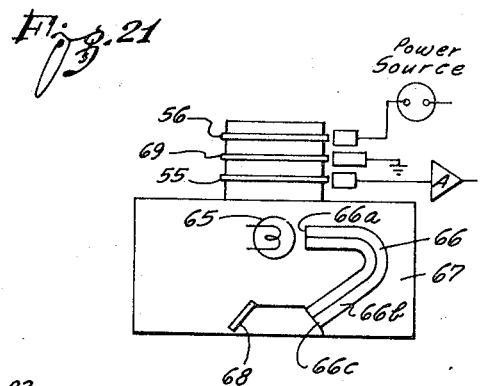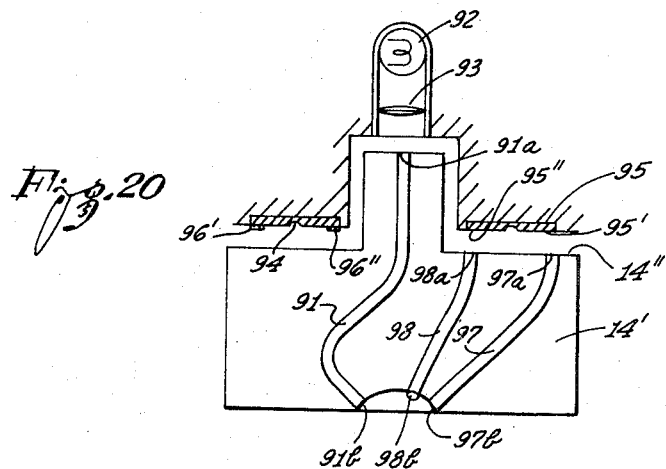

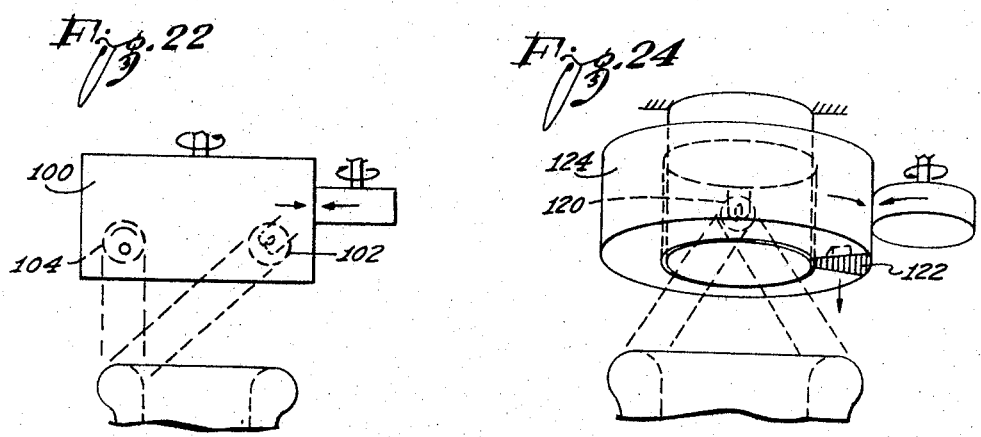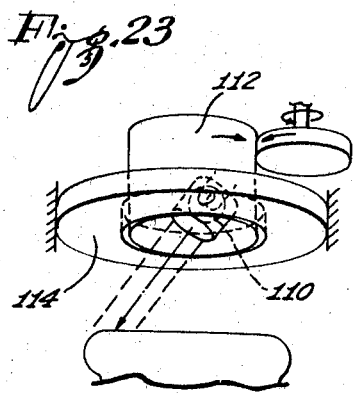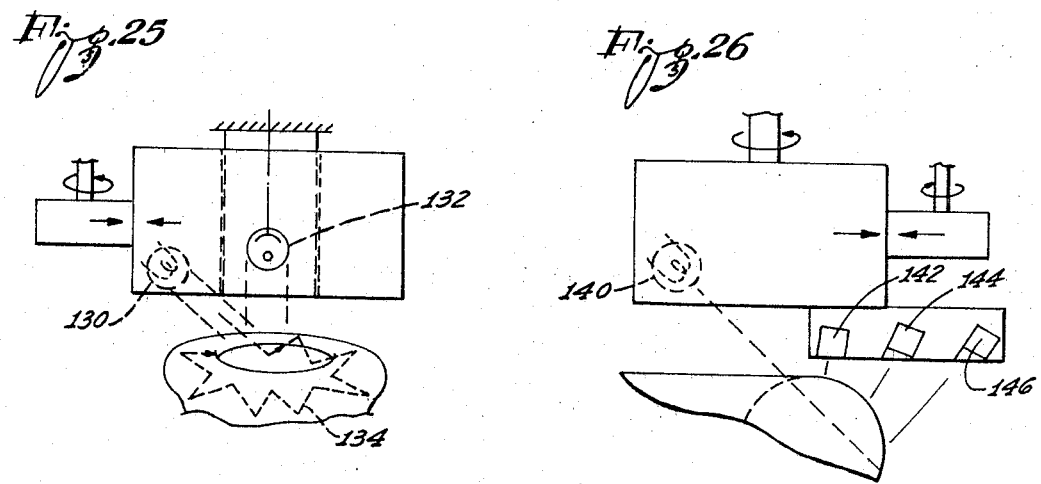

United States Patent Office 3,349,906
Patented Oct. 31, 1967

3,349,906
OPTICAL INSPECTION SYSTEM
Frederick L. Calhoun, Torrance, and Ronald A. Dawson, Redondo Beach, Calif., assignors to Industrial Dynamics Company, Ltd., Torrance, Calif., a corporation of California
Filed Aug. 4, 1964, Ser. No. 387,287
24 Claims. (Cl. 209—111.7)

The present invention relates to an optical inspection system for testing whether or not the tops of containers, particularly of glass containers such as bottles or the like, are undamaged.

Inspection systems of the character mentioned above usually operate in that they intervene in the transport of bottles or the like when being transported on a conveyor belt. For such inspection, a bottle is first removed from the conveyor belt. Second, the bottle is placed on a turntable. Third, the turntable with the bottle is accelerated to rotate under a stationary optical scanner focusing a beam on the rotating rim of such a bottle. Fourth, the reflection of the rim is observed by one or more photoelectric receivers, which are also stationary. Fifth, upon completion of this inspection, the turntable with the bottle is stopped. And sixth, the bottle is placed back upon the conveyor belt.

It is apparent that the process of removing the bottle from the conveyor belt, rotating it, stopping it, and placing it back onto the conveyor belt requires a certain minimum of time which cannot be exceeded. The speed with which glass bottles can be handled is quite limited, for otherwise the bottles would become damaged during the inspection process. The period thus required for handling and for inspection determines the maximum speed of conveying the bottle. It has been found that a bottle such as a soft-drink bottle cannot be passed at such an inspection point at a speed much above one hundred bottles per minute.

It is a primary object of the present invention to eliminate the above-mentioned limit of the number of bottles that can thus be handled per minute, so that the entire process of conveying bottles can be increased in speed.

It is another object of the present invention to conduct the inspection of the top portion of containers, such as glass bottles, without requiring the removal of the bottles from the conveyor belt.

It is accordingly an object of the present invention to eliminate the steps one, two, three, five and six outlined above.

It is a feature of the invention to provide for a new and improved inspection system which permits the inspection of the top portion of a bottle during the continued conveyance of such a container.

According to one aspect of the present invention in a preferred embodiment thereof, an optical inspection system for testing damage to the top of a container having a circular rim surrounding an opening is suggested, wherein there is provided a scanning head containing a first and a second light directing means such as a light-conductive rod, which directs light in a predetermined manner and each such rod having a front and a rear window. A light source directs lights into the rear window of, for example, the first conductor, so that the front window of this light conductor defines an illuminating beam. A light-sensitive element, such as a photoelectric receiver, observes the rear window of the second conductive rod; accordingly, this second light-conductive rod defines a detecting zone in front of its front window. The two light-conductive rods are oriented so that the illuminating beam of the first conducting rod intersects with the detecting region of the second conductive rod.

Light conducting rods suitable for the present invention usually comprise bundles of a large number of very thin glass fibers. Each single fiber is surrounded by a medium having a lower index of refraction than that of the fiber material permitting total reflection of light rays in a single fiber and striking the wall thereof at a rather shallow angle. The fibers each are cylindrical having a diameter of a few m$\mu$. A light conducting rod comprised of a bundle of such fibers conducts the light in its interior whereby such rod can be curved or even bent sharply, the light will follow this curved or bent path without substantial loss.

The scanning head, including two or more light-conductive rods of this type, is being rotated about an axis, so that the aforedescribed intersection of the illuminating beam and of the detecting region describes an annular inspection zone around this axis of rotation and has an average radius matching that of a rim of a bottle.

It is a feature of the present invention that the bottles to be inspected are being passed continuously under this rotating scanning head, whereby the top surface of the rim of each bottle or container temporarily passes through the inspection zone as outlined by the concurrently rotating illuminating beam and the detecting region of the two rods. In particular, for a short period of time, the top of a bottle must pass through a position so that its entire reflecting top surface is illuminated by the rotating illuminating beam. This condition is met if each bottle is being transported uninterruptedly on a conveyor belt through a position in which the center of the annular rim of each bottle passes through the above-mentioned axis of rotation.

Additionally, gating means are provided for opening the output channel defined by the above-mentioned photoelectric receiver for a period of time during which the center of each bottle top approximately coincides with said axis of rotation. This condition is met as long as said bottle center and axis of rotation are within a distance from each other of the order of $\frac{1}{16}$ inch. This range is true for the usual soft-drink bottles. However, many bottle rims are about as thick as soft-drink bottles.

It will be appreciated that, for regularly manufactured light conductors, an optical axis of each such rod can be defined to run through the geometrical center of an entrance or exit window of such a rod and in the direction of such a rod. As a general rule, one can say that optimum inspection conditions will prevail if the optical axis of an illuminating beam intersects with the optical axis of the pickup and detecting region. A slight misalignment of these two optical axes, however, is not critical as long as the illuminating beam is oriented so that a reflecting surface of a bottle top is capable of reflecting at least a portion of the illuminating beam into the entrance window of the light-conductive rod to which the photoelectric receiver is optically coupled.

The next general rule to be observed is that, during inspection, the center of the circular container should substantially coincide with the axis of rotation of the scanning head thus defining the inspection position.

The third rule is that the container to be inspected should be positioned relative to the illuminating beam and to the detecting or observation region of the second rod, so that the illuminated rim surface portion serves as a reflecting surface. In case direct and specular reflection is observed directly during the inspection period, the angles between the specular reflecting surface portion of the bottle and the two optical axes of the rods are similar, or at least substantially similar, and the undamaged rim will interruptedly and specularly reflect the illuminating beam toward and into the pickup rod.

The alternative condition is that the illuminating beam must strike an annular surface portion of the container top rim when in the above-defined inspection position. This annular surface portion must thereby be in the above-defined inspection zone monitored by one or even several pickup rods, but the optical axis of each such pickup rod is inclined to this surface portion at an angle that is different from the angle between this surface portion and the axis of the illuminating beam. In this case, light will be reflected into one or several pickup rods only by a damaged portion of the container rim.

It will be apparent and more appreciated below that a sytsem of two or more light conductor rods defines such an inspection channel. Such a channel includes a front exit window of an illuminating rod and front entrance windows of the pickup rods. All these front windows are facing and cooperating with reflecting container surface portions to be inspected. In principle, it makes no difference about the order of the illuminator and pickup rods since the reciprocity theorem holds. For example, if rods A and B make up a channel; rod A being the illuminator and rod B the pickup; then the light source could be placed behind rod B and the photoreceiver behind rod A with the same results. The same is true if multiple illuminators or pickup rods are used, i.e., if a rod A is the illuminator, and rods B and C are pickups then the same results can be obtained if rods B and C are illuminators and rod A is the pickup. Furthermore, since the light source is, in any event, an electric lamp, it is convenient to call the lamp and photoreceivers an electro-optical converter since they convert electricity into light and then light back into an electrical signal.

The "optical coupling" of such an electro-optical converter to the rear window of a light conductor thus means that provision is made so that either the light leaving such a rear window will reach a photoelectric receiver or the light from a lamp is permitted to enter such a rear window. Such optical coupling may well occur in between elements, one of which is rotating, while the other one is stationary.

Keeping the above definition in mind, it will be appreciated that a preferred embodiment of practicing the invention constitutes an optical coupling of a rotating illuminating rod to a stationary lamp. That is to say, the above-defined rear window of such an illuminating rod is also part of the rotating scanner head, while the lamp is mounted in the stationary structure, in such a position that a continuous and uniform light beam is directed into the rear window of the illuminating rod.

The photoelectric receiver can be attached directly to the rear window of the pickup rod and can rotate together with the scanning head. By way of a brush and slip ring arrangement, the electrical signal developed in the photoelectric receiver will be transmitted from the rotating scanning head to the stationary evaluating network. The evaluating electric circuit network can include means to suppress signals having a frequency equal to the rotational speed of the inspection head or other pickup. Furthermore, it is desirable to suppress signals which result from a seam or seams of a bottle.

It will be appreciated, and it will be developed more fully below, that either one or both or neither of the electro-optical converters can be rotating together with their light-conducting rods. The primary function of the rods is to direct the illuminating beams and to define pickup and detecting zones on definite portions of the surface of the bottle rims to be inspected.

While fiber optics constitute the preferred elements of directing light through the inspection head, other light directing means such as prisms, mirrors, lenses, etc. can also be used.

While the specification concludes with claims particularly pointing out and distinctly claiming the subject matter which is regarded as the invention, it is believed that the invention, the objects and features of the invention, and further objects, features and advantages thereof will be better understood from the following description taken in connection with the accompanying drawings in which:

FIG. 1 is a schematic side view of an inspection system including the scanning head and a bottle to be inspected according to a preferred embodiment of the invention;

FIG. 1a illustrates a top view of the inspection head illustrated in FIG. 1;

FIG. 2 illustrates schematically a block diagram of the evaluating circuit of a four-channel inspection head;

FIG. 3 illustrates somewhat schematically and in perspective view a bottle scanning station adjacent a conveyor;

FIG. 4 is a somewhat schematical side view of the inspection rods of a four-channel inspection unit;

FIG. 4a illustrates an illuminating beam, detecting region and a portion of the inspection zone of two cooperating light-conducting rods shown in FIG. 4;

FIGS. 5, 7, 9, 11, 13 and 15 illustrate top views of rod end portions in relative location to the top of a bottle;

FIGS. 6, 8, 10, 12, 14 and 16 illustrate cross-sectional side views of such rod ends also shown in position relative to the top of the bottle to be inspected;

FIG. 17 illustrates an enlarged cross-sectional view through the rim of a bottle and shows the areas inspected by the several channels;

FIG. 18 illustrates schematically a one-channel inspection unit;

FIG. 19 illustrates the optical inversion of the unit illustrated in FIG. 18;

FIG. 20 illustrates a cross-sectional view through an inspection head with the two electro-optical converters being part of the stationary structure;

FIG. 21 illustrates a cross-sectional view through an inspection head whenever the two electro-optical converters are both members of the rotating inspection head; and FIGS. 22 and 26, inclusive, illustrate schematically further embodiments of the invention.

Proceeding now to the detailed description of the drawing, the inspection system in general will be described with reference to FIGS. 1, 2 and 3.

Glass containers such as a bottle 10 are being passed on a continuously movable conveyor belt 11 for processing, and thereby they pass an inspection station 1, particularly under an inspection system which includes a rotatable scanning head 12. The guide rails 13 insure the center of each circular bottle-top passing through the axis of rotation of scanning head 12.

Scanning head 12 includes cylindrical member 14 which will also be described more fully below and which is mounted on a shaft 15 traversing a stationary bearing member 16. Shaft 15 is journaled in the stationary bearing member 16, for example, by means of ball bearings. Bearing member 16 serves for accurately mounting scanning head 12 above belt 11 and it may have an aperture 17 which is penetrated by a driving and transmission belt 18 partially enveloping the shaft 15. Driving belt 18 is being driven by a motor (not shown) at such a rate as to rotate the scanning head 12 at a speed in the order of 15 to 20 thousand r.p.m.

The upper neck of shaft 15 projects above the bearing member 16, and there are provided annular slip rings 19 scanned by stationary collector brushes 20. There are altogether five slip rings and five brushes to accommodate four photoelectric receivers in member 14 of the optical scanning head 12 and having common ground connection.

Above the upper end of shaft 15 there is mounted a stationary light source 21, and a condenser lens or condenser system 22 collects the emitted light and directs a beam axially toward the end of shaft 15. As will also be developed more fully below, there are light-transmitting rods terminating with one end each at the upper end of shaft 15, and the light emitted from light source 21 is being directed by condenser 22 through entrance windows into these light-conducting rods, FIG. 1a shows three light-entrance windows 51a, 52a and 53a as rear windows of three such light-conductor rods 51, 52 and 53.

Optical scanning head 12 includes four photocells, as stated, which are denoted with reference numbers 31, 32, 33 and 34. As schematically shown in block diagram of FIG. 2, the photoelectric receivers 31 through 34 respectively feed signals into amplifiers 41, 42, 43 and 44 respectively to increase the amplitude of the photoelectric output signals. The output terminals amplifiers 41, 42 and 44 are joined, and they feed their respective signals to a common network of tuned circuits 35.

The tuned circuits 35 include high-pass filters to eliminate from the signals furnished by either amplifier 41, 42 or 44 the frequency equal to the rotational speed of scanning head 12. For reasons also more fully developed below, the tuned circuits 35 may include low-pass filters for eliminating high frequencies well above those usually accompanying a signal representing a chip or crack in the top of any bottle. There is a tuned circuit 36 connected to the output side of amplifier 44, and the electrical filters incorporated in the circuit 36 have characteristics similar to those of the filters in network 35.

It is a significant feature of the present invention that the scanning head 12 is being rotated continuously during the entire inspection process, which includes checking on all bottles passing along on conveyor belt 11. Accordingly, it is desirable to have probing and testing signals available for only a short period of time during which a bottle such as 10 is in proper position beneath the member 14 of scanning head 12. This inspection position is principally defined to exist at the moment when the center of a circular top rim of bottle 10 passes through axis X of rotation of the scanning head 12. Accordingly, there are provided means for monitoring this correct position for inspection.

A light gate extends across the path of the bottles, which light gate is indicated in FIG. 1 by beam 37. Beam 37, of course, extends perpendicular to the plane of the drawing. This beam is monitored by a photoelectric receiver 38. Whenever a bottle 10 interrupts, or even just enters into, this light beam 37, a trigger signal is being drawn from photoelectric receiver 38 to trigger a monovibrator or one-shot oscillator 39. Monovibrator 39 produces an output pulse having a duration equal to the time of inspection. This period of time will be on the order of a few milliseconds.

The output voltage pulse of monovibrator 39 is being used as a gating signal for two gates 45 and 46. The two gates 45 and 46 have their respective signal input terminals connected to the output side of networks 35 and 36, respectively. The gating signal derived from monovibrator 39 governs the passage through the gates 45 and 46 of any signal developed by circuits 35 and 36. It thus appears that photoelectric signals derived from photocells 31 through 34 are permitted to pass through gates 45 and 46 only during the inspection period, while all other signals picked up by the photoelectric receivers 31 through 34 are being suppressed.

The signal output terminals of gates 45 and 46 are respectively connected to detectors 47 and 48, capable of distinguishing between a chipped and an unchipped bottle. It will be appreciated that the photoelectric receivers with amplifiers furnish a constant output during the inspection period whenever the top of a bottle is smooth. Accordingly, no signal will pass through tuned circuits 35 and 36.

Any chip will result in an amplitude change in one or more of the four channels, and there will be a signal transmitted by the tuned circuits 35 and/or 36, then passing through gates 45 and 46 to be picked up by detector 47 and/or detector 48.

An output signal indicative of a chipped bottle and furnished by either one or both of the detectors 47 and 48 is used to trigger a reject mechanism 40. Reject mechanisms capable of ejecting a damaged bottle from the conveyor belt are, for example, shown in the copending application of one of us, Frederick L. Calhoun, filed Jan. 3, 1964, Ser. No. 335,572, and now abandoned, and assigned of record to Industrial Dynamics Company, Ltd. It should be mentioned that separate gates such as 45 and 46 do not have to be provided, but the gating function may be incorporated in other elements. Amplifiers 41 through 44 may, for example, be of the gated amplifier type. The tuned circuits 35 and 36 may include gated filters. Also, detectors 47 and 48 may be gated detectors.

From the foregoing, it will be appreciated that the system as described will operate only if the photoelectric receivers 31, 32, 33 and 34 individually receive light or light beams which will change their intensities if the top rim of a bottle is chipped or otherwise damaged. It is thus critical that photoelectric receivers 31 through 34 must be positioned during the inspection period so that they do in fact monitor the rim or top of the bottle. It is important to note that conveyor belt 11 is not stopped during the inspection period and that a container such as bottle 10 is not removed from the conveyor belt, but that inspection is carried out without interrupting the transport of the bottles.

During the inspection period, the bottles may travel for a distance of about $\frac{1}{16}$ inch. Thus, the inspection position is extended to include a tolerance range permitting $\pm\frac{1}{32}$ inch deviation of the bottle center from the axis of rotation of scanning head 12. Head 12 must be positioned relative to the gating beam so that in fact the gating-open period of gates 45 and 46 coincides with this inspection position range, and the optical elements in member 14 of scanning head 12 must be placed so that they scan the rim of a bottle when in inspection position.

Member 14 is primarily comprised of a cylindrical or wafer-shaped body, consisting primarily of aluminum or plastic and having carved or molded cavities which permit the placement of light conductors such as glass fiber rods of suitable shape. The shape of these light conductors will be described more fully below. After these light conductors have been placed into these cavities, the remaining space is filled with a hard, organic filler such as "epoxy," so that the entire optical scanning head 14 is a solid member through and through, having no air space or holes in its interior.

FIG. 4 illustrates a side view of this inspection head 14, with the modification that it shows the various light-conductor rods; i.e., FIG. 4 illustrates the optical head as if its main body and the filling material were translucent.

There are first provided three light conductors 51, 52, and 53, each having a first straight portion—51b, 52b, 53b, respectively—which runs into shaft 15. The upper end of each of these three light conductors 51, 52 and 53 terminates at the top of shaft 15 and in the light entrance or receiving windows 51a, 52a, 53a, respectively, so as to receive light from the condenser lens 22. Thus, each of the light conductors 51, 52 and 53 first passes light axially through shaft 15 and into head 14.

Each light conductor 51, 52 and 53 is then bent radially, i.e., transversely to axis X of rotation of head 14, away from axis X and toward the outer circumference of head 14. Each light conductor 51, 52 and 53 is then additionally bent to have an end portion 51c, 52c and 53c, respectively, which directs the light at a proper angle toward the bottle rim to be inspected. Accordingly, each rod end portion 51c, 52c and 53c defines the direction of an illuminating beam for scanning the top rim of bottles.

The end faces 51d, 52d and 53d of these three light rods are exposed so that light can in fact be directed away from the lower face of optical head 14. Each end face 51d, 52d and 53d thus constitutes a light exit window through which passes an illuminating beam having a direction given to it primarily by the respective rod end 51c, 52c or 53c. The geometric center of each window 51d, 52d or 53d, together with the direction of the corresponding rod end, defines an optical axis for such an illuminating beam.

It should be mentioned that light rods 51, 52 and 53 can be bent as is most convenient for placing each of the light rods into the cavities of the body constituting head 14 and for maintaining the rods securely in their respectively assigned places and positions. The primary function of the various bends in each of the light conductors is the proper orientation of front windows 51d, 52d and 53d, through which windows the monitoring illuminating beams leave the scanning head to be directed toward the bottle rim. Accordingly, the light rods are bent so that the light entering them at their rear and light entrance windows 51a, 52a, 53a will be conducted so that suitably directed and oriented illuminating beams leave the front or light exit windows 51d, 52d, 53d respectively. The optical axis of each of such monitoring light beams extends perpendicular to the window faces 51d, 52d, 53d, and the specific individual orientation of these optical axes will be described more fully below.

The body of member 14 further includes the four photoelectric receivers 31, 32, 33 and 34, which may be solid-state elements such as solar cells or other suitable photo elements. These four photoelectric receivers are attached to the rear window of four small light-rod studs 61, 62, 63 and 64, respectively. Since photoelectric receivers are placed inside the optical head 14, no extensive light conductiton is required, so that these studs 61 through 64 can be quite short. The front windows 61a, 62a, 63a, and 64a of these four studs are exposed, and they are oriented to respond to certain light components taken from the aforedescribed illuminating beams. Each pickup rod 61 through 64 has a directtion which, together with the geometrical center of a window 61a through 64a, defines an optical axis. Additionally, each such rod has a pickup or detecting region symmetrically disposed relative to its optical axis. Such a detecting region is defined as follows:

A light beam, having a component propagating in the direction of the optical axis and entering the front entrance window (such as 61a through 64a) of a pickup rod, will be regarded as in the detecting region of such a rod when the beam will pass through the pickup rod, and leave same at its rear window to pass into the photoelectric receiver attached to such a rear window of the pickup rod. Since the front or light-entrance window of each pickup rod 61 through 64 is positioned close to the bottle rim to be observed, the detecting region of such a rod is substantially a geometrical extension of the pickup rod, there being only a small widening at a small apex angle.

FIG. 4a illustrates the illuminating region of illuminating rod 51 and the detecting region of detecting or pickup rod 61. The principal feature of FIG. 4a is the illustration of the illuminating region of illuminating rod 51 intercepting the detecting region of pickup rod 61, to define the inspection zone.

As can be seen from FIG. 4, there are altogether three light-exit or illuminating windows 51d, 52d and 53d; and there are four light-entrance or pickup windows 61a, 62a, 63a and 64a. Each one of these windows defines the end face of a more or less short but straight light-conducting rod portion. The direction of extension of such short portions is substantially perpendicular to the extension of the adjoining window. The geometrical center of each window together with the direction of the adjoining light-conductor rod portion defines the optical axis of each such window.

The positioning of the various light rods is somewhat critical in that the thus defined optical axis of window 51d should intersect the optical axis of window 61a. In this case, maximum use is made of the illumination as provided by the beam leaving rod window 51d. In order to be operative at all, it is necessary for the illuminating beam leaving window 51d to intersect the detecting region as defined in front of window 61a. Here the optical axes might miss each other, but as long as the beam and detecting region intersect at all, light detection is possible. This situation may be described as an approximate or substantial intersection of the optical axes of the illuminating beam and detecting region. Of course, it will be understood that the precise intersection of the two optical axes constitutes the optimum detection possible.

Correspondingly, the optical axis of window 52d should directly intersect or must approximately intersect the optical axis of window 62a; and the optical axis of window 63a and the optical axis of window 53d should both intersect the optical axis of window 64a.

It will further be appreciated that these four points of intersection or the zone of beam and detecting region intersection, two of which may coincide, describe inspection circles or annuli during the rotation of the inspection head. It is important that, during the gating open period (photocell 38 operating gates 45 and 46), each of these inspection circles or annulars substantially coincides with or passes through an annular surface portion on the top rim of a bottle to be inspected and momentarily present in this thus defined annular inspection zone during the gating open period.

To be more explicit, the region in which an illuminating beam and a detecting region intersect develops an annulus during rotation of the scanning head 12, and this annulus has dimensions similar and comparable to that of the container rim top. When such top passes through this inspection annulus during the inspection period, the top offers reflecting surface portions having similar angles to both illuminating beam and detecting region, so that the illuminating beam will at least partially be reflected directly into the detecting region.

Two modes of operation are possible. In one mode, an unchipped surface portion of a bottle top has such an orientation so as to produce specular reflection. In this case a photocell at the end of the respectively cooperating detecting region receives light throughout the inspection period but such received light decreases if a chip or a flaw passes through the inspection zone. The other mode results in such orientation of beam and detecting region that only a chipped bottle top temporarily directs reflected light into this detecting region.

The specific orientation of the various windows of the several light conductors will be described next and with reference to FIGURES 5 through 16. Common to all these figures is the fact that this orientation will be described with reference to an annular bottle rim to be inspected during the inspection period, which is quite short, and the displacement of the bottle by the conveyor belt is negligibly small with respect to the geometrical configuration of the bottle rim now to be considered. In other words, the inspection is carried out so rapidly that the bottle hardly moves under the scanning head and relative to its axis of rotation during the inspection period.

It is pointed out that the positioning of rotating scanning head 12 and of the bottle, particularly the upper rim thereof to be inspected, is quite definite in view of the fact that the conveyor belt 11 is to be run strictly perpendicularly to the axis of rotation of the scanning head 12. The top of a bottle is usually parallel to the plane defined by the conveyor belt 11 which plane is perpendicular to the axis of rotation of scanning head 12. The position of a bottle to be inspected is further made definite by the guide rails 13 which ensure that the center of each bottle will pass through the axis of rotation of scanning head 12, and inspection is being triggered by the gating beam 37 as before described. Thus it is proper to define the position of the several exit and entrance windows of the various light rods in relation to the bottle top to be inspected.

Proceeding now to the description of inspection channel I, and particularly to FIGURES 5 and 6, there is shown the rod end 51c defining and directing the illuminating beam for this inspection channel I. Returning briefly to FIGURES 3 and 4, one can see that each of the light rods 51, 52 and 53 pass through the shaft 15 in slightly off center position. Accordingly, the middle bent portion of light rod 51 is first being laterally displaced inside of head 14 so that its center runs directly through the center axis of rotation of scanning head 12. From there the end portion 51c of this light rod 51 is being bent outwardly in radial direction, and the optical axis of the light beam leaving window 51d is inclined to the axis of rotation by an angle which is slightly more than half a right angle.

The light beam leaving the window 51d is being directed toward the innermost rim portion of the bottle as schematically shown in FIGURE 17. In view of this selected angle the light beam will be reflected by this innermost rim portion of a bottle in a direction which is almost vertical.

The stud 61 is being positioned so that its light entrance window 61a is substantially horizontally oriented, and its detecting region is oriented to receive the illuminating beam from window 51d after reflection by an undamaged rim. This position is being shown in FIGURES 7 and 8. It will be appreciated that optimum conditions are present when the optical axis of the illuminating light beam passing through exit window 51d and the optical axis of the entrance window 61a intercept, this being a matter of accurately positioning rods 51 and 61. During rotation this point of interception describes a circle which is positioned at the innermost circular portion of the rim of the bottle presently inspected. The scanning head 12 will be adjusted in vertical direction, i.e., in axial direction, vary accurately prior to the commencement of inspection and conveyance of bottles, so that a maximum of light from the beam be reflected by the bottle into the detecting range of rod 61.

In more general terms, the inspection channel I operates in that normally light emitted by the light rod 51 through its exit window 51d will be reflected specularly by a bottle rim toward the entrance window 61a to be passed on into the photoelectric receiver 31 attached to the rear end of rod 61. Accordingly, the photoelectric receiver 31 will receive light as long as the rim of the bottle and particularly the innermost portion of this rim is intact. A chip or crack will deflect the illuminating light beam as directed by the light conducting rod end 51c so that a chip or crack is being registered as a modulation, i.e., a decrease of the light intensity as received by the receiver 31.

Next, channels II and III shall be described. These two channels have a common light source which is constituted by the illuminating beam leaving light conducting rod 52 at the window 52d thereof. Channels II and III are distinguished from the other channels in that the pickup rods 62 and 63 have their entrance windows 62a and 63a, respectively, oriented so that an unbroken or unchipped bottle rim reflects the light beam as directed toward it through the exit window 52d away from the entrance windows 62a and 63a. The relative orientation of the entrance and exit windows of the light rods constituting channels II and III will be understood best with reference to FIGURES 9 through 14.

In FIGURE 9 and FIGURE 10 there is illustrated the orientation of light conducting rod end 52c and the light exit window 52d thereof. This end 52c and particularly the optical axis running through the exit window 52d is inclined toward the vertical by an angle which is roughly one-half of a right angle. This is illustrated in FIGURE 10. The optical axis running through the window 52d when projected into a plane of the rim of bottle 10 is inclined to an intersecting radius of the circular rim by an angle more than half a right angle but less than two-thirds therefrom. As can be seen from FIGURE 17, this light illuminates the top part of the rim of a bottle.

FIGURES 11 and 12 illustrate the orientation of rod or stud 62 with its entrance window 62a as the optical input for channel II. The optical axis of pickup rod 62 is oriented in a plane running through the axis of rotation of scanning head 12. Additionally, the optical axis of pickup 62 as running through the entrance window 62a is inclined to the vertical direction by a rather small angle, below 10 degrees.

FIGURES 13 and 14 illustrate pickup rod 63 as a light detecting and guiding element for channel III. The projection of the optical axis of rod 63 into a plane running through the horizontal plane of the top rim of the bottle 10 is inclined to a radius for the circular top rim intersecting the optical axis by an angle which is roughly one-fourth of a right angle. Additionally, the optical axis running through the front and entrance window 63a is inclined to the vertical direction by an angle not quite half a right angle.

By comparing FIGURES 10, 12 and 14, it is readily apparent that the light pickup and conducting rods 62 and 63 cannot possibly pick up any portion of the light beam as directed by the exit window 62d toward the more or less flat top portion of the bottle rim and as reflected therefrom. Any crack, chip or the like, however, will reflect light in various directions, such reflected light will reach one or both of the entrance windows 62a and 63a so as to detect such a crack.

Turning now to FIGURES 15 and 16, there is shown the illuminating beam as well as the optical pickup constituting channel IV. The pickup of channel IV is to normally receive light reflected by an unchipped bottle. Accordingly, the optical axis running through exit window 53d and in the direction of illuminating rod end 53c, and the optical axis runnnig through entrance window 64a of pickup rod 64 are inclined by similar angles relative to a particular plane which includes the axis of rotation of the scanning head 12. For this reason, FIGURE 16 shows the two rods 53c and 64 in an aligned relationship. The optical axes are inclined by an angle not quite half a right angle relative to the vertical direction. The two optical axes in question are shown in FIGURE 15 as being inclined by similar angles each not quite half a right angle and measured to a radius running through the center of the bottle rim.

In FIGURES 5, 7, 9, 11, 13 and 15, the bottle rim of bottle 10 is shown in exactly the same position and these six figures are comparable as far as relative angular positioning is concerned. In other words, all rods or rod ends are shown in their true relative positioning about the axis of rotation. One can see that the area of interception between bottle rim on one hand and either one of the three illuminating light beams are angularly offset. Accordingly, during rotation of the scanning head 12, a particular chip or crack will never simultaneously affect channels I and IV and either one of channel II or III. This is the reason why in FIGURE 2 the channels I, II and IV are shown to feed a common detector 47. This combining of channels is permissible because none of these selected three channels will ever be activated by one particular chip at the same time. Of course, one can see from FIGURES 9 through 14 that a particular chip may very well activate channels II and III concurrently so that channels II and III should not feed to the same detector. It will be appreciated that instead of combining channels I, II and IV, one could also combine channels I, III and IV.

The pickup channels in this embodiment operate dynamically, i.e., the pickup channels in the scanning head 12 rotate so that the entrance windows 61a through 64a continuously alter their orientation relative to the staionary environment. Accordingly, the effect of stray and ambient light on the photoelectric receivers cannot be eliminated by way of DC bias in a manner commonly used in stationary photoelectric monitoring devices. Thus, a bright ambient light spot might produce light blips in one or more of the pickup channels thereby simulating chipped bottle tops.

In order to eliminate such ambient light effects it is an important feature of the invention to interpose an infrared filter between the entrance window of each pickup rod and the solar cell or photoelectric receiver, observing the rear window of such rod. Preferably, infrared filters 50 are interposed between the rear window of each light conducting pickup rod 61 through 64 and the photoelectric receiver attached thereto. The input or, more particularly, the optical input of each of the solar cells is thus limited to infrared. Thereby the overall gain is somewhat reduced. However, it has been found that accuracy and sensitivity still suffice to detect the chips and cracks on bottles.

Reference is now being made to FIGURES 18 and 19. In FIGURE 18 there is shown a simplified and modified version of the above described embodiment, i.e., there is a light source 71 and a condensor lens 72 directing an axial beam toward the rear and entrance window of a hollow light channel 73. This channel 73 is comprised of three straight but angularly offset portions. The light in channel 73 is first reflected by a mirror 74 and then by a prism 74' to leave the exit window of channel 73 through a focusing lens 75 as an illuminating beam directed at a predetermined angle against the rim or a portion of the rim of a bottle to be inspected. Reflected light is being picked up by the entrance window 76a of a short light rod 76 having attached to its rear photoelectric receiver 77. The output of this photoelectric receiver 77 is fed through two slip rings 78, and an external evaluating network 79 including amplifiers, etc., is being used for the detection of the signals representing chips in bottle tops.

This embodiment is characterized by the fact that the light source is a stationary one and the light beam is conducted into the rotating scanning head. A light directing means guides this illuminating light through the optical scanning head toward the surface for directing a beam at a particular predetermined angle toward the bottle to be inspected. On the other hand, the photoelectric receiver rotates with the optical inspection head, and the electrical output of this photoelectric receiver is then being monitored by a slip ring-brush combination for the transmission of such signals to the stationary, i.e., non-rotating evaluating network.

FIGURE 19 illustrates that the inspection principles involved operate also on an inverted basis. In this case, electric power is fed to two slip rings 81 and 82 and from there through conductors running through the interior of the inspection head to the light source 83 which thus rotates together with the inspection head. The rotating light source 83 directs a light beam into a straight bore 84 and to be focused by a lens 85 at the exit window of bore 84.

A light rod 86 is now used to monitor the light reflected by the bottle to be inspected. The light rod 86 has an entrance window 87, and light rod 86 is curved to conduct the light into the interior of the inspection head and from there into the shaft of rotation. The light will leave the rod 86 at its rear window 89 in the top portion of the rotating shaft, and a stationary photoelectric receiver 88 is positioned above the top portion of the shaft so that the light leaving the rear window 89 of light rod 86 is permitted to be directed into photoelectric receiver 88.

It should be mentioned that in this latter embodiment, one also can use more than one pickup channel and, of course, more than one light source and light directing element. In case the pickup rods all cooperate with different light sources arranged angularly around the inspection circle, one can use a single photocell above the center of the upper shaft face which single photocell then observes all of the light beams as picked up by each rod, and all pickup rods direct a single axial beam upwardly into the single photoelectric receiver 88. Since in case of an angular separation of the monitoring spots around the inspection circle on the bottle, light fluctuations of a singular chip will again affect only one pickup channel at a time.

It will be appreciated that it is difficult in principle to conduct light beams into and/or out of a rotating member. As long as only a single channel is being employed, this difficulty does not arise because in that case the conducting light rod portion running through the shaft is positioned to have its optical axis coinciding with the axis of rotation of the optical inspection head, and the rear window is directly concentrical to the shaft end opposite the scanning head. In case of more than one channel, not all rods can run coaxially through the shaft.

In the embodiment described with reference to FIGURES 1 through 17, the problem of conducting light into the rotating scanning head was solved in using light rods for running the monitoring and illuminating beams into the scanning head 12, which rods had upper portions, i.e., the portions 51b, 52b and 53b, that are being placed closely together and symmetrically in the axis of rotation. The rear windows 51a, 52a and 53a, through which the light enters from the stationary light source, are thus being placed very close together and also symmetrically with respect to the axis of rotation. There is thus provided a very uniform light pattern for bottle rim illumination. Since additionally the circuit network evaluating the output signals is provided with high-pass filters, the frequency corresponding to the rotation of the scanning head is being eliminated. Thus, any modulation of the light beam due to the off-center position of each of the light rods 51, 52 and 53 adjacent the light source 21 is being eliminated electrically.

It will further be appreciated that the same rule applies in case of an optical inversion, i.e., in case an embodiment is used as shown in FIGURE 19. In FIGURE 19 a stationary photoelectric detector observes one or even more than one monitoring beams resulting from one or several optical pickups. Any signal of rotational frequency pickup is electrically eliminated.

In view of this electrical filtering action eliminating the frequency which corresponds to the rotation of the inspection head, actually the conduction of light into or out of the rotating head does not have to be extremely close to the center of the shaft. However, it is desirable to operate the device with a reasonably high signal-to-noise ratio and, of course, the frequency signal corresponding to the rotation must here be regarded as a noise signal. Thus it is desirable and reasonable to optically aid in the removal of this frequency and in the removal of signals having the frequency of the rotation of the inspection head. For this reason it is desirable to conduct any light into and/or out of the rotating inspection head by way of light beams which are very close to the center of rotation.

FIGURE 20 illustrates a further embodiment of the invention. Here the scanning head is also somewhat different from the scanning head 12 of the aforedescribed embodiments, the member 14' attached to the driving shaft 15' has a rather wide and annular upper surface 14''. The scanning head is driven as outlined in connection with FIGURE 1. For reasons of simplicity, a dual channel inspection and monitoring system with one illuminating beam is shown in FIGURE 20. There is a first light conductor 91 having an upper portion traversing the shaft 15' in axial direction and terminating in a first or rear window which in this case is a light entrance window 91a placed very close to the center of the upper end face of shaft 15'. Centrally above this upper end window there is mounted a light source 92 and a condenser lens or lens system 93 directing an axial light beam toward the entrance window 91a.

The stationary supporting structure has a lower shoulder which faces directly the upper end face 14" of member 14'. An annulus 95 is mounted on this shoulder of the supporting structure and coaxially to the axis of rotation of shaft 15'. The annulus 95 is comprised of photosensitive material, for example of the PN-junction type and thus constitutes a ring-shaped photoelectric receiver. However, a ring-shaped open groove 94 traverses the PN junction to provide for two independent concentrical photoelectric receivers 95' and 95". Pickup electrodes 96' and 96" respectively and independently draw current from these receivers 95' and 95". The two photoelectric receivers individually observe the rear exit windows 97a and 98a respectively of two light rods 97 and 98. During rotation of the scanning head these windows 97a and 98a which are light exit windows of two pickup channels, thus continuously face portions of the annular photoelectric receivers 95' and 95", respectively. Any eccentricity is electrically eliminated by filtering the frequency corresponding to the rotation of the scanning head.

Light conducting rods 91, 97 and 98 respectively have lower front windows 91b, 97b and 98b which windows each have an optical axis as aforedefined. The optical axes emanating from the three windows 91b, 97b and 98b may intercept in a point which during rotation defines a circle, and this circle is substantially located in or about surface rim portion of a bottle top during the inspection engaging period as above defined.

Thus, in the embodiment shown in FIGURE 20 there is a two-way light passage as between the stationary supporting structure and the rotating scanning head. Of course, this embodiment is not limited to a dual channel inspection and there may be more than one illuminating beams with, for example, the illuminating light rods such as 91 being bundled in the shaft 15' similar to the bundle of light conducting rods best shown in FIGURE 3 of the preferred embodiment of the invention.

No difficulty arises if more than two such annular shaped photoelectric receivers have to be provided. They all have to be concentrically disposed with respect to each other and to the axis of rotation of shaft 15' and the pickup light conducting rods of each channel are eccentrically disposed inside of the shaft 15' with respectively different distances from the axis, which distances from the axis of rotation will then correspond to the average radius of the respectively cooperating annular photoelectric receiver on the stationary part of this structure.

Proceeding now to the embodiment described in FIGURE 21, there is shown the optical scanning head with a shaft, but the shaft in this case is not being traversed by any light conducting rods. Again, for reasons of simplicity, a single channel inspection system is shown.

Illumination is had from a light source 65 such as a lamp which is positioned in a cavity inside of the body 67. The light source 65 has its filament positioned precisely in the axis of rotation of the scanning head. Thus, the filament is not being subjected to any centrifugal force.

Adjacent this lamp 65 there appears the entrance window 66a of a light conductor 66 which is rather short, but has at least one bent portion so as to terminate in a front stud 66b having a defined direction so that its light exit window 66c directs an illuminating light beam toward a bottle rim as was outlined above with reference to any of the previously described illuminating windows. In this case a solid state photoelectric receiver 68 is positioned rather close to the front window of this pickup channel.

Each of the electrical elements 65 and 68 is provided with two electrical conductors. Any one or all of the electrical conductors may be interconnected to lead to an external terminal of ground or reference potential. For this purpose there is provided a slip ring 69. An electrical conductor leads from the other terminal of the photoelectrical receiver 68 to a slip ring 55, and the respective other conductor of the lamp 65 leads to a slip ring 56. The three brushes scanning the slip ring 69, 55 and 56, respectively, connect these two channel portions to a source of suitable lamp driving potential and to the input terminals of an amplifier, respectively.

It will be appreciated that in this embodiment all of the electrical-optical converters such as the light source and the photoelectric receivers are embedded in the body 67, and only electrical connectors are being made to the stationary exterior of the inspection system.

The embodiment shown in FIGURE 22 is similar to that shown in certain of the previous figures in that it includes a rotatable head 100. A source 102 of energy such as light is disposed within the head and is oriented to direct light toward a particular portion of the rim of each container transported past the head. Receiving means 104, such as a photoelectric cell responsive to light, is disposed within the head 100 and is oriented to receive the energy passing from the rim of each container transported past the head 100.

Preferably the receiving means 104 is oriented to receive the light passing from the particular portion of each container rim corresponding to the portion receiving the light from the source 100. Under such circumstances, the receiving means 104 produces a constant signal as the head 100 is rotated, provided that there is no defect in the rim of the container. However, when there is a defect in the rim of the container, the receiving means 104 produces a negative pulse when the rim of the container is positioned so that the energy from the source 102 passes to the defect. This pulse is processed by electronic circuitry, such as shown in the previous figures, to provide an indication that there is a defect in the rim of the container.

The receiving means 104 may also be oriented to receive only light dispersed or scattered from the rim of the container upon the occurrence of a defect in the rim of the container. Under such circumstances, a positive pulse would be produced by the receiving means 104 in each revolution of the head 100. This pulse is processed by electronic circuitry, such as shown in the previous figures, to provide an indication that there is a defect in the rim of the container.

The embodiment shown in FIGURE 22 is similar to that shown in certain of the previous figures except that it does not include any light-directing means, such as fiber rods of optical properties. Under such circumstances, it may be desirable to recess the source 102 and the receiving means 104 in the head 100. It will also be appreciated that the receiving means 104 may constitute one or a plurality of members disposed to receive energy from different portions of the rim.

The embodiment shown in FIGURE 23 also does not involve the use of light-directing means such as fiber rods. In the embodiment shown in FIGURE 23, a source 110 may be disposed in a head 112 to rotate with the head and to direct energy to progressive portions on the rim of the container. Receiving means 114 may be fixedly positioned to receive the energy returned from progressive portions of the rim of the container as the head 112 is rotated. Preferably the receiving means 114 may constitute a cylinder sensitive to the energy returned from the rim of the container. When constructed in this manner, the receiving means 114 produces a constant signal except when energy from the source 110 passes to a defect in the rim of the container. It will be appreciated, however, that the receiving means 114 may have any other configuration and may also constitute a plurality of members such as described for the embodiment shown in FIGURE 23.

The embodiment shown in FIGURE 24 is similar to the embodiment shown in FIGURE 23 except that a source 120 is stationary and receiving means 122 is disposed within a head 124 to rotate with the head. The source 120 may be constructed and oriented to illuminate the entire periphery of the container rim with energy such as light. As the receiving means 122 rotates, it scans progressive portions of the container rim for defects.

In the embodiment shown in FIGURE 25, the energy passing to the container rim from a source 130 is reflected in the container rim, as indicated by broken lines 134, provided that there are no defects in the rim. The reflection may occur in one or a plurality of bounces between the inner and outer peripheries of the container rim. However, if there is a defect in the container rim, the energy becomes scattered and is not reflected through any successive bounces. This scattered energy is refracted as it passes from the rim of the container. Receiving means 132 is disposed to receive the scattered energy and to produce signals in accordance with the characteristics of the received energy. In the embodiment shown in FIGURE 25, either the source 130 or the receiving means 132 or both the source and the receiving means may be rotatable.

The embodiment shown in FIGURE 26 is included to illustrate the concept of spatial filtering. It includes a source 140 and a plurality of receiving means 142, 144 and 146. Each of the receiving means 142, 144 and 146 is oriented to receive energy returned from essentially different portions of the periphery of a container rim when the container rim is considered on a cross-sectional basis, such as on a cross-section defined by a radial line extending from the annular center of the rim to the annular periphery of the rim. By careful orientation of the receiver means and special combination of their output signals, defect selection or discrimination can be achieved. In the embodiment shown in FIGURE 26, either the source 140 or the receiving means 142, 144 and 146 or both the source and the receiving means may be rotated. It will also be appreciated that the source 140 may actually be formed from a plurality of members each oriented to obtain the passage of energy to an individual one of the receiving means 142, 144 and 146. As in the previous embodiments shown in FIGURES 22 to 25, inclusive, no energy-directing means such as fiber rods are included in the embodiment shown in FIGURE 26. However, it will be appreciated that such energy-directing means can be included in the embodiment shown in FIGURE 26.

Although the invention has been disclosed with particular reference to light sources and photoelectric receiver means, it will be appreciated that any suitable type of energy source and energy-receiving means may be used. Actually, the energy may constitute radiation in a particular range of frequencies such as the infrared range. It will also be appreciated that the radiation does not have to be limited to a particular frequency range, especially if other techniques are used such as to modulate the energy or light at a particular frequency such as 10 kilocycles per second.

As used in the claims, the energy-directing means such as the light directing rods are disposed relative to the rims of the containers such that the energy directed to the containers travels in a path which intersects the energy travelling from the containers in an inspection region at the rims of the containers. As the rims of the containers are scanned throughout their complete periphery as by rotation of the light-directing rods, the inspection region describes an inspection zone corresponding to the rims of the containers.

The invention is not limited to the embodiments described above, but all changes and modifications thereof not constituting departures from the spirit and scope of the invention are intended to be covered by the following claims.

What is claimed is:
1. A system for inspecting for defects in the rims of containers, including:
   conveyor means for providing a movement of the containers;
   energy means positioned relative to the rims of the containers to energize the rims of the containers;
   energy-sensitive means positioned to receive energy returned from said container rims;
   means for moving at least one of said energy means and energy-sensitive means relative to said containers whereby the container rims are scanned by said energy-sensitive means;
   means to process the energy received by said energy-sensitive means for providing an indication of defects in the container rims;
   and means for activating the processing means only when the containers have been moved to a particular position relative to the energy means and the energy-sensitive means.

2. The system set forth in claim 1 wherein the energy-sensitive means is positioned relative to the containers and to the energy means to receive the energy reflected from the rims of the containers.

3. The system set forth in claim 1 wherein the energy-sensitive means is positioned relative to the containers and to the energy means to receive the energy refracted from the rims of the containers.

4. An inspection system for testing the rims of containers for defects, including:
   conveyor means for moving the containers in a particular direction;
   means positioned relative to the conveyor means for inhibiting movements of the conveyor means in directions transverse to the particular direction;
   a movable scanning head including radiation-producing means oriented relative to the rims of the containers to direct radiation to a particular position on the container rims and further including radiation-sensitive means oriented relative to the rims of the containers to receive radiation returned from said particular position on the container rims and to provide an output in accordance with such received radiation;
   means for moving said scanning head relative to said containers whereby said directed radiation from said radiation-producing means covers the container rims;
   means for processing the output of said radiation-sensitive means to provide an indication of defects in the container rim in accordance with changes in the radiation received by the radiation-sensitive means;
   and means for activating the processing means only during the time that the containers have a particular position relative to the movable scanning head.

5. An inspection system as set forth in claim 4, including, means included in the processing means for eliminating signals at frequencies representing the speed of the movable scanning head.

6. An inspection system for testing the rims of containers for defects, including:
   conveyor means for moving the containers in a particular direction;
   means disposed relative to the conveyor means for inhibiting the movement of the containers in directions transverse to the particular direction;
   means positioned to direct radiation on the container rims;
   radiation-sensitive means positioned relative to the rims of the containers to receive only the radiation returned from defects in said container rims and to produce an output in accordance with the received radiation;
   means for moving at least one of the radiation means and the radiation-sensitive means in a path to obtain a scanning of the container rims by the radiation-sensitive means;

means for operating upon the output of said radiation-sensitive means to provide an indication of defects in the container rims;

and means for activating the operating means only during the occurrence of a particular positioning of the containers relative to the radiation-directing means.

7. A system for inspecting for defects in the rims of containers, including:

conveyor means for moving the containers in a particular direction;

a radiation source positioned to direct radiation on the rims of containers;

multiple radiation-sensitive means each oriented to receive radiation passing from different portions of the rims of the containers and to provide an output in accordance with the received radiation;

means for obtaining a motion of at least one of the radiation source and of the multiple radiation-sensitive means whereby said radiation from said radiation source is directed to the rims of the containers to be inspected;

means for operating upon the outputs of said multiple radiation-sensitive means to obtain a signal representative of any defects in the container rim;

and means for activating the operating means only during a particular positioning of the containers relative to the radiation source.

8. An optical inspection system for testing for defects in the annular rims of containers, including:

a rotatable scanning head including a plurality of illuminator light-directing means and a plurality of receiver light-directing means having front and rear windows to test for defects on a different portion of the rims of the containers by directing light in first paths through the front windows toward the rims of the containers and receiving such light in the second paths through the front windows from the rims of the containers where the first and second paths intersect at regions corresponding to the rims of the containers;

means operative upon the containers for continuously moving the containers past said rotatable head;

means coupled to the scanning head for rotating said scanning head whereby the intersecting regions of said front windows of corresponding illuminator light directing means and receiving light directing means describe annuli corresponding the annular rims of the containers;

illuminator means optically coupled to the rear windows of the illuminator light-directing means;

photoelectric receiver means optically coupled to the rear windows of the receiver light-directing means for producing output signals in accordance with the characteristics of the received light; and means coupled to said photoelectric receiver means for operating upon said output signals to provide an indication of defects in the rims of the containers.

9. A system for inspecting for defects in container rims, including:

conveyor means for moving the containers continuously in a particular direction;

a radiation source;

a movable head disposed relative to the container rims;

first radiation-directing means in said head and positioned to direct radiation from said source to a particular portion of the container rim to be inspected;

a second directing means in said head and positioned to intercept radiation returned from the container rim;

means to move said head whereby said radiation is directed over the container rims;

radiation-sensitive means positioned to receive the radiation intercepted by said second directing means;

means responsive to the output of said radiation-sensitive means for providing an indication of defects in the container rim in accordance with changes in the radiation received by said radiation-sensitive means;

and means operatively coupled to the last mentioned means for activating the last mentioned means only during a particular disposition of the containers relative to the first radiation-directing means.

10. In a system for inspecting for defects the rims of containers continuously transported in a particular direction by a conveyor:

conveyor means for moving the containers continuously in the particular direction;

a scanning head containing first and second energy-directing means each constructed to define an individual energy path intersecting the energy path of the other directing means in an intersection region at the rims of the containers;

energy-producing means positioned relative to the first energy-directing means for introducing energy to said first energy-directing means;

receiving means positioned to receive the energy passing from the second energy-directing means and to produce signals in accordance with the energy received;

means for moving the scanning head in a path relative to the conveyor and the transported containers whereby said intersection region describes an inspection zone corresponding to the rims of the containers;

means operatively coupled to the receiver means for obtaining the rejection of containers having defects in the rims of the containers in accordance with the characteristics of the signals produced by the receiver means;

means operatively coupled to the last mentioned means for activating the last mentioned means only during a particular positioning of the container relative to the energy-producing means.

11. An inspection system for testing for defects in the rims of containers, including:

a scanning head containing first energy means and second energy means disposed relative to each other and to the rims of the containers to provide energy paths intersecting in a region that includes a portion of the rims of the container;

means for obtaining a movement of said scanning head in a path relative to said containers whereby said intersecting region describes an inspection zone defining the rims of the containers;

means for continuously moving the container rims through said inspection zone;

the first energy means being constructed to introduce energy to the rims of the containers at the intersecting region;

the second energy means being constructed to receive energy returned from the rims of the containers and to produce signals in accordance with such received energy; and means responsive to the signals from the second energy means for providing an indication as to any defects in the rims of the containers passing through the inspection zone in accordance with the characteristics of the signals prouded by the second energy means.

12. An inspection system for testing the rims of containers for defects, including:

conveyor means for continuously moving the containers in a particular direction;

a scanning head containing first and second energy-directing means disposed relative to each other and to the container and constructed to provide energy paths wherein the energy paths of said first and second energy-directing means intersect in a particular region at the rims of the containers;

means for moving said scanning head relative to said containers whereby the region of intersection of said energy paths from said first and second energy-directing means describes an inspection zone having a configuration corresponding to that of said container rims and substantially coinciding with said container rims;

means disposed relative to said first energy-directing means for introducing energy to said first energy-directing means for introduction of the energy by the first energy-directing means to the region of intersection at the rims of the containers;

energy-sensitive means disposed relative to said second energy-directing means for producing signals in accordance with the characteristics of the energy passing from the container rims to the second energy-directing means;

means coupled to the energy-sensitive means for providing an indication of defects in the container rims in accordance with the characteristics of the signals produced by the energy-sensitive means;

means coupled to the last mentioned means for obtaining an operation of the last mentioned means only during the occurrence of a particular positioning of the containers in the particular direction; and means operatively coupled to the last mentioned means for obtaining a rejection of containers having indicated defects in the rims of the containers.

13. In the system set forth in claim 12, said energy-producing means and said receiver means being mounted in said scanning head for movement with the head.

14. In a system for inspecting for defects in the rims of containers transported in a particular direction by a conveyor where the rims of the containers have centers:
   first means for introducing energy to a particular portion of the rims of the transported containers;
   first and second energy-receiving means oriented to receive energy passing from the particular portion of the container rims;
   means for obtaining a movement of at least one of the first means and the energy-receiving means in a path to scan the rims of the transported containers; and
   first and second circuit means respectively connected to said first and second energy-receiving means to individually process the signals received therefrom for providing an indication of defects in the rims of the containers in accordance with the characteristics of such signals.

15. In a system for inspecting for defects in the rims of containers transported by a conveyor:
   a plurality of first energy means, said first energy means being individually oriented toward angularly offset portions of the rims in the transported containers;
   a plurality of second energy means, said second energy means being respectively oriented to receive energy passing from individual ones of the angularly offset portions of the rims of the transported containers in accordance with defects in the containers;
   means for obtaining a rotation of at least one of the plurality of first energy means and the plurality of second energy means to scan the rims of the containers; and
   means coupled to the second energy means for operating upon the energy received by the second energy means for providing an indication of defects in the rims of the containers.

16. In a system for inspecting for defects in the rims of containers transported by a conveyor:
   first means for introducing energy to the rims of the transported containers;
   first and second energy-receiving means individually oriented at particular angles relative to said container rims to face different portions of the container rims to individually receive energy passing from said different portions of said rims;
   a third energy-receiving means oriented to face substantially the same portion of the rims of the transported containers as said second energy-receiving means but at a different angle than the particular angle of said second energy-receiving means;
   means for obtaining a movement of at least one of the first means and of the first, second and third energy-receiving means in a path to scan the rims of the transported containers;
   signal-combining means connected to said second and third energy-receiving means to produce a common output having characteristics dependent upon the signals produced by the second and third energy-receiving means; and
   signal means connected to said first energy-receiving means for separately processing the signals produced by said first energy-receiving means.

17. A system for inspecting the rims of containers for defects, including:
   conveyor means for continuously moving the containers in sequence past a particular position without any interruption in the movement of the containers at the particular position and without any rotation of the containers;
   scanning means positioned relative to said conveyor, means to monitor said containers at said particular position during the uninterrupted movement of the containers past the particular position, the scanning means defining a detecting region and including means for directing energy to the rims of the containers during the movement of the containers past the particular position to obtain a passage of the energy from the rims of the containers at the particular position in accordance with the occurrence of any defects in the rims of the containers;
   receiver means responsive to the energy passing from the rims of the containers for producing signals having characteristics in accordance with the characteristics of such energy;
   means for facilitating an optical isolation of the scanner means from the receiver means;
   means responsive to the signals produced by the receiver means and operative during the uninterrupted movement of the containers for providing a rejection of containers in accordance with the characteristics of such signals;
   and means operatively coupled to the last mentioned means for obtaining the operation of the last mentioned means only during the disposition of the containers substantially at the particular position.

18. In a system for inspecting the rims of containers for defects:
   a conveyor constructed to obtain a movement of the containers in a particular direction without any interruption in the movement of such containers and without any rotation of the containers;
   means disposed relative to the transported containers for directing energy to the rims of the containers at a particular position along the conveyor;
   means disposed relative to the containers for receiving energy passing from the rims of the containers at the particular position;
   means for rotating at least one of the energy-directing means and the energy-receiving means relative to the containers;
   means for facilitating an optical isolation of the energy-directing means from the energy-receiving means during the rotation of at least one of the energy-directing means and the energy-receiving means relative to the containers;
   means responsive to the energy received by the last mentioned means for providing an inidcation as to the occurrence of defects in the containers in accordance with the characteristics of the received energy; and means for providing an operation of the last mentioned means only during the movement of the containers substantially past a particular position in the particular direction.

19. In a system for inspecting for defects in the rims of containers:
   a conveyor for obtaining a continuous transport of the containers without any interruption in the movement of the containers and without any rotation of the containers;
   first and second energy-directing means disposed relative to each other and to the conveyor to provide energy paths intersecting in an inspection region at the rims of the containers;
   means for obtaining a rotation of at least one of the first and second energy-directing means relative to the containers;
   means for facilitating an optical isolation of the first and second energy-directing means during the relative rotation between the first and second energy-directing means and the container;
   means disposed relative to the first energy-directing means for introducing energy to the first energy-directing means for introduction by the first energy-directing means to the inspection region at the rims of the containers;
   means disposed relative to the second energy-directing means for receiving the energy passing to the second energy-directing means from the inspection region at the rims of the containers and for producing signals in accordance with such received energy;
   means for obtaining the operation of the last mentioned means only during the movement of the containers substantially past a particular position.

20. An inspection system for testing the rims of containers for defects, including:
   a scanning head containing first and second energy-directing means disposed relative to each other and to the container and constructed to provide energy paths wherein the energy paths of said first and second energy-directing means intersect in a particular region at the rims of the containers;
   means for moving said scanning head relative to said containers whereby the region of intersection of said energy paths from said first and second energy-directing means describes an inspection zone having a configuration corresponding to that of said container rims and substantially coinciding with said container rims;
   means disposed relative to said first energy-directing means for introducing energy to said first energy-directing means for introduction of the energy by the first energy-directing means to the region of intersection at the rims of the containers;
   energy-sensitive means disposed relative to said second energy-directing means for producing signals in accordance with the characteristics of the energy passing from the container rims to the second energy-directing means;
   means coupled to the energy-sensitive means for providing an indication of defects in the container rims in accordance with the characteristics of the signals produced by the energy-sensitive means; and
   means operatively coupled to the last mentioned means for obtaining a rejection of containers having indicated defects in the rims of the containers, said energy-introducing means and said energy-sensitive means being stationary and only said scanning head being movable.

21. An inspection system for testing the rims of containers for defects, including:
   a scanning head containing first and second energy-directing means disposed relative to each other and to the container and constructed to provide energy paths wherein the energy paths of said first and second energy-directing means intersect in a particular region at the rims of the containers;
   means for moving said scanning head relative to said containers whereby the region of intersection of said energy paths from said first and second energy-directing means describes an inspection zone having a configuration corresponding to that of said container rims and substantially coinciding with said container rims;
   means disposed relative to said first energy-directing means for introducing energy to said first energy-directing means for introduction of the energy by the first energy-directing means to the region of intersection at the rims of the containers;
   energy-sensitive means disposed relative to said second energy-directing means for producing signals in accordance with the characteristics of the energy passing from the container rims to the second energy-directing means;
   means coupled to the energy-sensitive means for providing an indication of defects in the container rims in accordance with the characteristics of the signals produced by the energy-sensitive means; and
   means operatively coupled to the last mentioned means for obtaining a rejection of containers having indicated defects in the rims of the containers, one of said receiver means and of said energy-producing means being mounted in said scanning head and the other one of said energy-producing means and of said receiver means being stationary.

22. In an inspection system for testing the rims of containers for defects:
   a scanning head including a first energy-directing means and a plurality of second energy-directing means, each energy-directing means constructed to pass energy in a restricted path, the restricted energy path of each of said second energy-directing means substantially intersecting the energy path of said first energy-directing means at various angles to form an inspection region at the rims of the containers with the first energy-directing means; and
   means for moving said scanning head whereby said inspection region describes an inspection zone defining the rims of the containers, the first energy-directing means and the plurality of second energy-directing means constituting light-conducting members having optical axes defining the restricted energy paths of such energy-directing means.

23. A system for inspecting the rims of containers for defects, including:
   conveyor means for continuously moving the containers in sequence past a particular position without any interruption in the movement of the containers at the particular position and without any rotation of the containers;
   scanning means positioned relative to said conveyor means to monitor said containers at said particular position during the uninterrupted movement of the containers past the particular position, the scanning means defining a detecting region and including means for directing energy to the rims of the containers during the movement of the containers past the particular position to obtain a passage of the energy from the rims of the containers at the particular position in accordance with the occurrence of any defects in the rims of the containers;
   receiver means responsive to the energy passing from the rims of the containers for producing signals having characteristics in accordance with the characteristics of such energy;
   means responsive to the signals produced by the receiver means and operative during the uninterrupted movement of the containers for providing a rejection of containers in accordance with the characteristics of such signals; and means for moving the scanning means during the movement of the containers past the particular position to obtain a detection of defects in the rims of the containers.

24. In a system for inspecting for defects in the rims of containers:

a conveyor for obtaining a continuous transport of the containers without any interruption in the movement of the containers and without any rotation of the containers;

first and second energy-directing means disposed relative to each other and to the conveyor to provide energy paths intersecting in an inspection region at the rims of the containers;

means disposed relative to the first energy-directing means for introducing energy to the first energy-directing means for introduction by the first energy-directing means to the inspection region at the rims of the containers; and means disposed relative to the second energy-directing means for receiving the energy passing to the second energy-directing means from the inspection region at the rims of the containers and for producing signals in accordance with such received energy, the first and second energy-directing means constituting light-conducting members.

References Cited

UNITED STATES PATENTS

| | | | |
|---|---|---|---|
| 2,265,037 | 12/1941 | Gulliksen | 88—14 |
| 2,268,498 | 12/1941 | Bryce. | |
| 2,506,672 | 5/1950 | Kell et al. | 250—227 X |
| 2,825,260 | 3/1958 | O'Brien | 88—1 |
| 2,902,151 | 9/1959 | Miles et al. | 209—111.7 |
| 2,947,877 | 8/1960 | Stoate | 209—111.7 X |
| 3,081,666 | 3/1963 | Calhoun et al. | 209—111.7 X |
| 3,089,594 | 5/1963 | Early | 209—111.7 |
| 3,171,033 | 2/1965 | Mathias et al. | 88—14 X |
| 3,245,533 | 4/1966 | Rottmann | 209—111.7 |

OTHER REFERENCES

IBM Technical Disclosure Bulletin, vol. 4, No. 7, page 85, December 1961.

M. HENSON WOOD, JR., *Primary Examiner.*

J. N. ERLICH, *Assistant Examiner.*